United States Patent [19]

Tuggle

[11] 3,874,721
[45] Apr. 1, 1975

[54] RETRACTABLE LOAD BED COVER
[75] Inventor: John D. Tuggle, Ryan, Okla.
[73] Assignee: Tuggle Inc., Ryan, Okla.
[22] Filed: May 11, 1973
[21] Appl. No.: 359,454

Related U.S. Application Data
[63] Continuation-in-part of Ser. No. 217,919, Jan. 14, 1972, abandoned.

[52] U.S. Cl. .............................................. 296/105
[51] Int. Cl. ............................................. B60j 7/24
[58] Field of Search ...................... 296/105, 104, 43

[56] References Cited
UNITED STATES PATENTS
2,486,170  10/1949  Kavanaugh .......................... 296/105
3,064,667  11/1962  Marino ............................... 296/105
3,606,448  9/1971   Walker ............................... 296/105
3,688,787  9/1972   Feather .............................. 296/105

Primary Examiner—Robert R. Song
Attorney, Agent, or Firm—Clarence A. O'Brien; Harvey B. Jacobson

[57] ABSTRACT

A load bed cover adapted to be slidably mounted in a track on the bed of a cargo carrying vehicle comprises a plurality of inverted U-shaped frame members, pairs of interpivoted arms connecting the frame members for movement toward and away from each other on rollers adapted to be received in the track, a collar slidably mounted on each side of each frame member for pivotal connection of the upper ends of the arms thereto, a connector block fixedly mounted at the lower ends of each side of each frame member for pivotal connection of the lower ends of the arms thereto, and a canopy disposed within and attached to the inner surface of the frame members.

13 Claims, 9 Drawing Figures

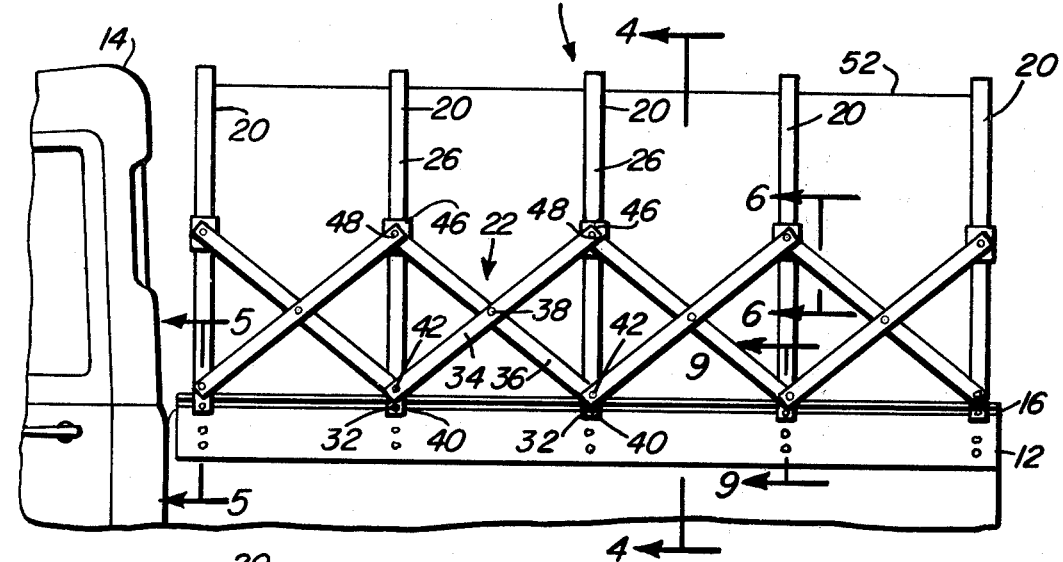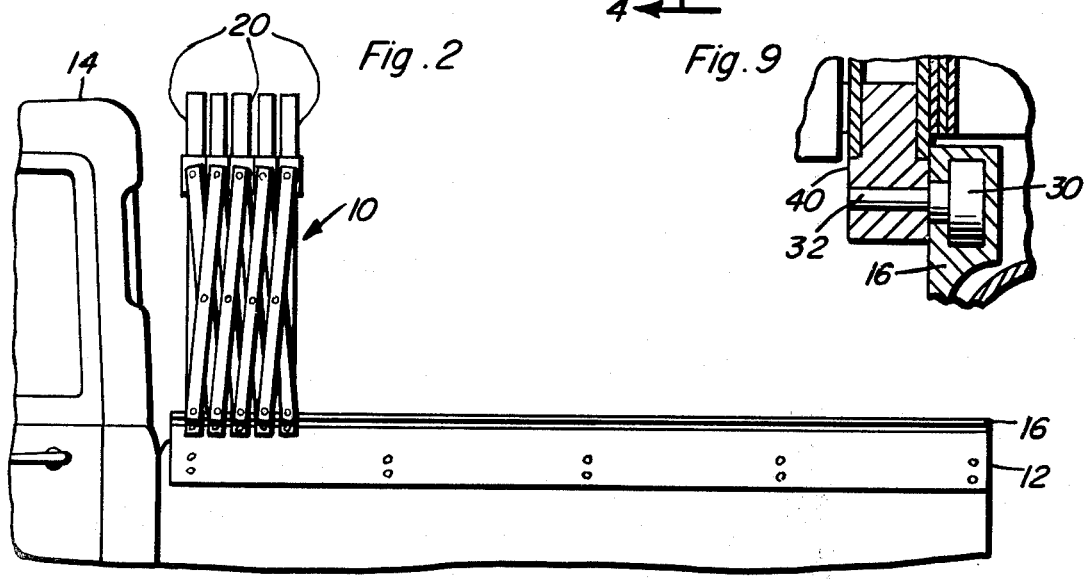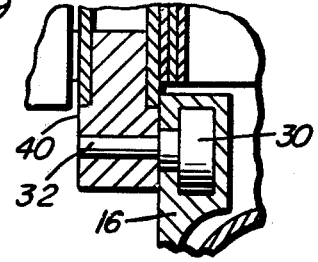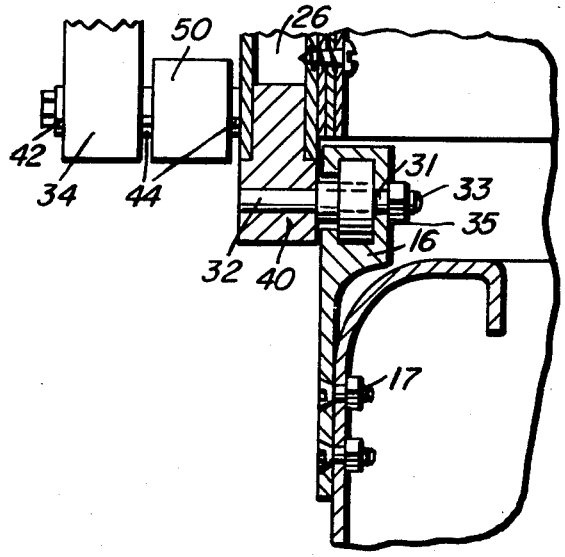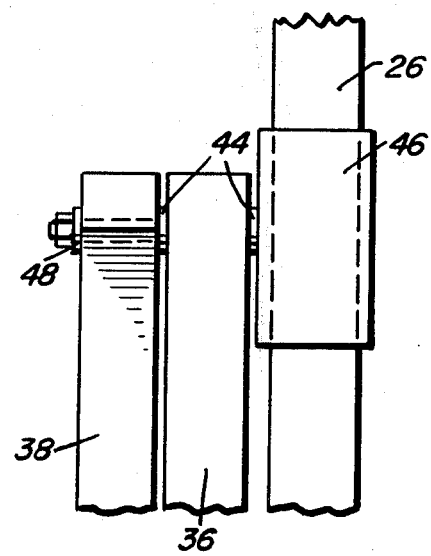

RETRACTABLE LOAD BED COVER

This application is a continuation-in-part of my co-pending application Ser. No. 217,919, filed Jan. 14, 1972 now abandoned.

The present invention relates to covers for land vehicles, and, more particularly, to retractable covers for the cargo carrying portions of trucks.

Load bed covers for cargo carrying vehicles are desirable to provide protection to the cargo during high speed travel as well as from the elements. Retractable covers are particularly useful to permit wide flexibility in the types of cargo loads which can be carried. Particularly when installed on relatively small cargo vehicles, such as pick-up trucks, they should be capable of easy operation by one man, and when not in use or needed, they should take up as little space as possible. To date, no easily operated retractable cover is known which can withstand the rough usage associated with cargo handling and high speed movement while at the same time is simple, durable and inexpensive and which requires few modifications to the cargo vehicle itself.

It is therefore an object of the present invention to make available a durable, simple and easy-to-use cover that can be retracted out of the way for loading or unloading or whenever it is not needed, yet can easily be installed on the vehicle bed for protection from high speed driving or the elements.

It is another object of the present invention to provide a retractable load bed cover which requires few modifications to the vehicle bed.

It is still another object of the present invention to provide a retractable load bed cover having a canopy attached inside the cover frame to permit collapse of the frame into a small package and to prevent excessive wear and tearing of the canopy.

Other objects and advantages will become apparent from the following description and appended claims.

Briefly stated, in accordance with the aforestated objects, the present invention provides a retractable load bed cover adapted to be installed on the load of a land vehicle comprising a plurality of inverted U-shaped frames, each frame comprising a top portion and side portions depending from opposite ends of said top portion, roller means extending from said frames at the lower end of said side portions and adapted to be received and to roll within track means mounted on said vehicle, means for interconnecting said frames for movement toward and away from each other, and canopy means disposed within and attached to said frames along the inner surface thereof.

The invention will be better understood from a consideration of the following description taken in conjunction with the accompanying drawings.

FIG. 1 is a side elevation of the retractable load bed cover of the present invention showing the cover in an extended or open position installed on the bed of a cargo carrying truck.

FIG. 2 is a side elevation of the retractable load bed cover of FIG. 1 in a closed or collapsed position.

FIG. 5 is a sectional view taken substantially along the line 5—5 in FIG. 1.

FIG. 6 is a sectional view taken substantially along the line 6—6 in FIG. 1.

FIG. 9 is a sectional view taken substantially along the line 9—9 in FIG. 1.

Figure 3:
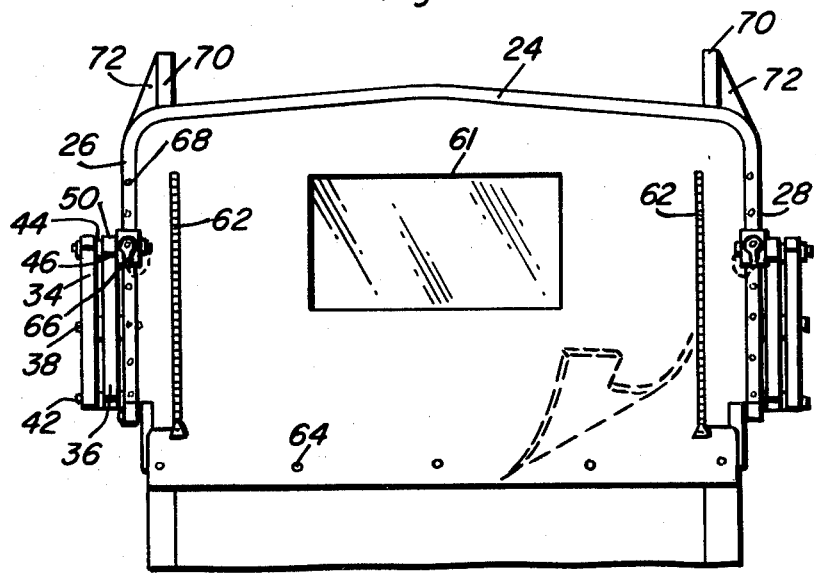
FIG. 3 is a rear elevation of the retractable load bed cover of FIG. 1.

Referring now to the drawings, there is shown generally at 10 the retractable load bed cover of the present invention installed on the bed 12 of a cargo carrying vehicle which includes a cab 14 forward of bed 12. For purposes of orientation, reference herein to the term "front" as applied to cover 10 refers to that portion thereof most closely adjacent cab 14 and use of the term "rear" in connection therewith refers to the portion thereof most remote from cab 14.

Extending rearwardly from a point adjacent the rear of cab 14 along the sides of bed 12 are channels 16 which serve as the track in which cover 10 may roll as it is operated to its extended position (FIG. 1) or its collapsed position (FIG. 2). Channels 16 may be secured to load bed 12 by bolts 17, as most clearly shown in FIG. 5, or attached thereto in any other suitable manner, such as by welding. As shown, the channels open sidewardly to receive rollers which extend inwardly from the frames of cover 10, as will be described more fully hereinafter. However, it will be appreciated that channels 16 may open along their upper surface to receive rollers which depend from the lower ends of the frames, or, may have any other suitable orientation to function as the track in which cover 10 may roll.

Cover 10 consists of a plurality of inverted U-shaped frames 20 in spaced-apart parallel relation interconnected by linkages 22 which permit the distance between frames 20 to be increased or decreased and thereby the length of cover 10 varied. Each frame 20 consists of a top portion 24 and depending side portions 26 and 28. As can be seen most clearly in FIG. 9, rollers 30 mounted for rotation on shafts 32, and adapted to be received within channel 16, extend inwardly of frames 20 from the lower ends of side portions 26, 28 thereof. It will be appreciated that rollers 30 may also depend from the lower ends of frames 20 to roll in suitable oriented channels 16 or may extend from frames 20 in any other convenient fashion.

In lieu of rollers 30, means to securely maintain front frame 20 in fixed position relative to cab 14, and to anchor cover 10 onto bed 12 are provided at the lower ends of side portionss 26, 28, as shown in FIG. 5. Shaft 32, associated with side portion 26 of front frame 20, has a threaded portion 33 extending inwardly of frame 20 beyond roller 30. An opening 31 is provided in the web of channel 16 to receive threaded portion 33 therethrough and locknut 35 is provided to secure the lower portion 26 of the front frame in fixed position along channel 16. The lower portion 28 of front frame 20 is fixedly secured to channel 16 in a similar manner, not shown.

Figure 7:
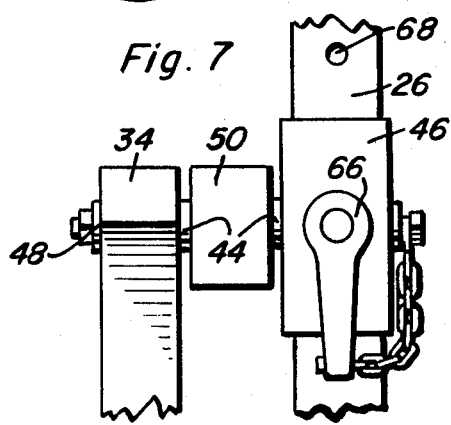
FIG. 7 is an enlarged rear elevation of a portion of FIG. 3 illustrating the means whereby the retractable load bed cover may be locked in position.
Figure 8:
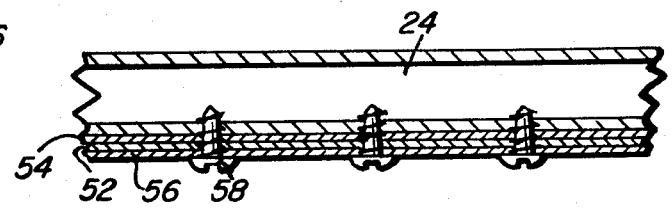
FIG. 8 is an enlargement of a portion of FIG. 4 showing the means whereby the canopy is secured to the inner surface of a frame member.

Each linkage 22 comprises a pair off like arms 34 and 36, pivoted at their mid-portions by pin 38. A series off connector blocks 40 are fixedly mounted on the lower ends of frame side portions 26, 28, and the lower ends of arms 34 and 36 are pivotally connected thereto by pivot pin 42. A series of collars 46 are slidably mounted on frame side portions 26 and 28 and the upper ends of arms 34 and 36 are pivotally connected thereto by pivot pin 48. As can be most clearly seen in FIG. 7, spacer block 50 is provided between frame side portions 26, 28 and the upper ends of arm 34 on rear frame 20. Likewise, as can be seen in FIG. 5, a similar spacer block 50 is provided between frame side portions 26, 28 and the lower ends of arm 34 on front frame 20. Spacer washer 44 are provided between the adjacent surfaces of arms 34 and 36 and of blocks 40, collars 46 or spacer blocks 50 and arms 34, 36 at all intersections thereof to permit relative pivotal movement without binding.

Frame members 20 and arms 34, 36 are made of metal stock, and preferably of square or rectangular tubing. Other hollow tubing, such as round tubing, may be used, but is not preferred. Flat stock is not preferred because it may not provide the strength required for travel at highway speeds.

A flexible waterproof canopy 52, which may be of canvas or other suitable material, is disposed and attached inside frames 20, i.e. along the inner periphery of the inverted U-shape defined by the frames. Attachment in this amnner permits canopy 52 to be stretched when frames 20 are extended, and to pleat and fold below frames 20 when frames 20 are collapsed. Thus, when the weight of the canopy causes it to sag at points intermediate the frames, the fact that the canopy is attached to the inside surface of the frames and therefore folds below top portion 24 prevents it from becoming pinched, chafed or torn. In addition, by disposing and attaching canopy 52 within frames 20, cover 10 may be collapsed accordion style, into a very small package.

Figure 4:
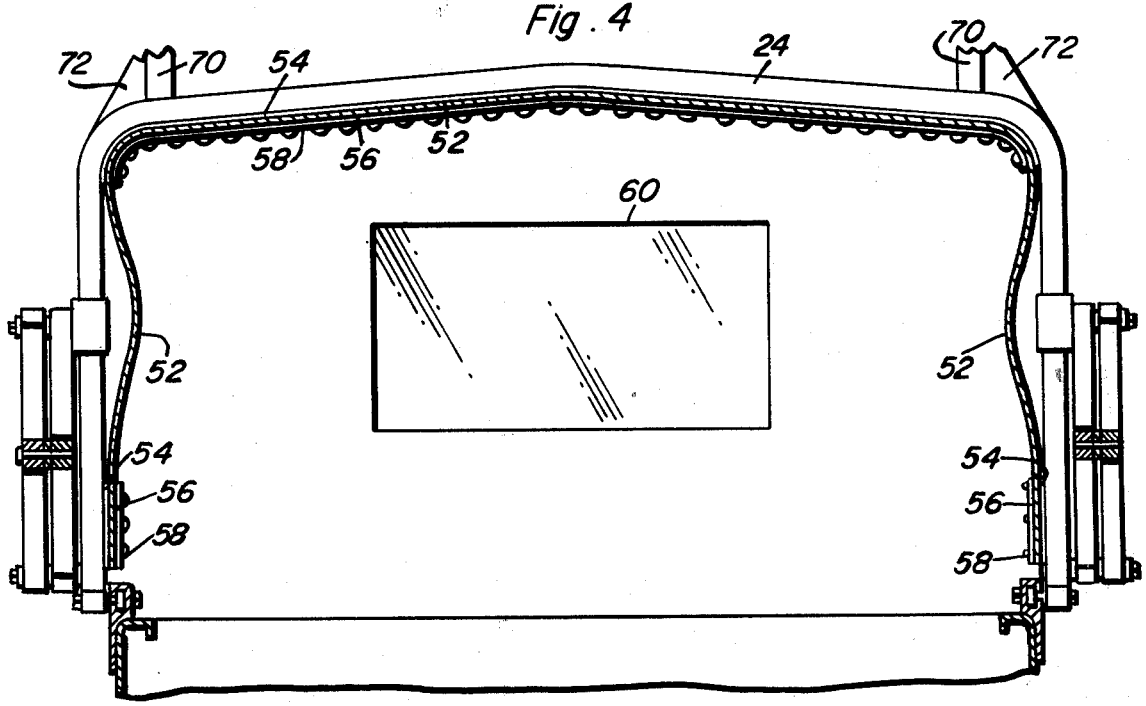
FIG. 4 is a sectional view taken substantially along the line 4—4 of FIG. 1.

Canopy 52 is secured at multiple points along the inner surface of the portion 24 and side portions 26, 28 of each frame 20, as can most clearly be seen in FIG. 4. In securing canopy 52 into contact with the inner surface of frames 20 it is desirable to attach, as by sewing, a webbing 54 to the inner surface of the canopy, i.e. the canopy surface remote from the frame. Attaching strip 56 is disposed along the inner surface of webbing 54 to provide a bearing surface for the canopy securing means, such as sheet metal screws 58. Screws 58 pass through strip 56, webbing 54 and canopy 52, and are secured to frame 20. In this manner, canopy 52 is preferably attached to the inner surface of frame 20 along the entire inner surface of top portion 24 and at at least one point adjacent the lower end of each side portion 26, 28. Care should be exercised that canopy 52 be secured to side portions 26, 28 at a point where it will not interfere with the slidable movement of collars 46.

Canopy 52 has front and rear end portions which may include windows 60, 61, respectively, therein of suitable material such as isinglass, plastic or the like. The rear end portion of canopy 52 preferably includes zippers 62 and fastening means, such as snap fasteners 64, for eacy access to the inside of the covered load bed without need to collapse cover 10.

Operation of the retractable load bed cover of the present invention is a arelatively relatively matter. With the cover collapsed, as shown in FIG. 2, the cargo may be loaded onto the bed of the truck. After loading, the rear frame 20 will be rolled back along channel 16 the desired distance and locked in place. Locking may be accomplished by insertion of locking pin 66 through collar 46 on rear frame 20 and into one of a series of vertically spaced apart recesses 68 in the rear face of rear frame side portions 26, 28. Since collar 46 slides vertically along rear frame 20 as the frame is moved forwardly or rearwardly to collapse or extend cover 10, the vertical position of collar 46, and thus the recess on the frame with which collar 46 will align will be determined by the extent to which cover 10 is opened.

While the present invention has been described with reference to particular embodiments thereof, it will be understood that numerous modifications may be made by those skilled in the art without actually departing from the scope of the invention. Accordingly all suitable modifications and equivalents may be resorted to which fall within the scope of the invention as claimed.

What is claimed as new is as follows:

1. A retractable cover adapted to be installed on the load bed of a land vehicle comprising:

a plurality of inverted U-shaped frames, each frame comprising a top portion and side portions depending from opposite ends of said top portion;

follower means at the lower ends of said side portions adapted to engage and to be guidingly supported from track means mounted on said vehicle;

means for interconnecting said frames for movement toward and away from each other; and canopy means disposed within and attached to said frames along the inner surface thereof, said canopy means comprising a canopy adapted to be stretched within said frames when said cover is extended and to pleat and fold below said frames when said cover is collapsed.

2. A retractable cover, as claimed in claim 1, wherein said means for interconnecting said frames comprises a plurality of pairs of arms, each said pair of arms intersecting and pivotally connected at their mid-points and disposed between adjacent frames, and means on said frames for pivotal connection of the arms thereto.

3. A retractable cover, as claimed in claim 2, wherein said means for pivotal connection of the arms thereto includes block means fixedly mounted on the lower ends of the side portions of each frame for pivotal connection of the lower ends of said arrms thereto and collars slidably mounted on the side portions of each frame for pivotal connection of the upper ends of said arms thereto, said collars adapted to slide upwardly on said side portions as said frames are moved toward each other.

4. A retractable cover adapted to be installed on the load bed of a land vehicle comprising:

a plurality of inverted U-shaped frames, each frame comprising a top portion and side portions depending from opposite ends of said top portion;

roller means at the lower ends of said side portions and adapted to be received and to roll within track means mounted on said vehicle;

means for interconnecting said frames for movement toward and away from each other; and canopy means disposed within and attached to said frames along the inner surface thereof, said canopy means comprising a canopy adapted to be stretched within said frames when said cover is extended and to pleat and fold below said frames when said cover is collapsed, and canopy attaching means, said attching means comprising a webbing on the surface of said canopy remote from said frames, a bearing member disposed on the surface of said webbing remote from said canopy and connecting means passing through said member, said webbing and said canopy and secured to said frames.

5. A retractable cover, as claimed in claim 3, including means to lock said cover in a closed, partially extended or fully extended position.

6. A retractable cover adapted to be installed on the load bed of a land vehicle comprising:

a plurality of inverted U-shaped frames, each frame comprising a top portion and side portions depending from opposite ends of said top portion;

follower means at the lower ends of said side portions adapted to engage and to be guidingly supported from track means mounted on said vehicle;

means for interconnecting said frames for movement toward and away from each other, said means comprising a plurality of pairs of arms, each said paair of arms intersecting and pivotally connected at their mid-points and disposed between adjacent frames, and means on said frames for pivotal connection of the arms thereto, said means for pivotal connection including at least one collar slidably mounted on the side portions of each frame for pivotal connection of the upper ends of said arms thereto;

canopy means disposed within and attached to said frames along the inner surface thereof, said canopy means comprising a canopy adapted to be stretched within said frames when said cover is extended and to pleat and fold below said frames when said cover is collapsed; and means to lock said cover in a closed, partially extended or fully extended position, said locking means including a plurality of vertically spaced recesses in the side portions of at least one of said frames, an aperture in at least one of said collars slidable on said side portions, said aperture adapted to be aligned with each of said recesses in said side portions as said collars slide vertically on said side portions, and a locking pin for insertion into said aperture and an aligned recess, whereby said pin prevents further slidable movement of said collars.

7. A retractable cover, as claimed in claim 6, including means retaining the front frame in fixed position on the load bed.

8. A retractable cover adapted to be installed on the load bed of a land vehicle comprising:

a plurality of inverted U-shaped frames, each frame comprising a top portion and side portions depending from opposite ends of said top portion, and means for retaining the front frame in fixed position on the load bed;

roller means extending from the lower ends of said side portions and adapted to be received and to roll within track means mounted on said vehicle;

means for interconnecting said frames for movement toward and away from each other, said means comprising a plurality of pairs of arms, each said pair of arms intersecting and pivotally connected at their mid-points and disposed between adjacent frames, and connecting means on said frames for pivotal connection of the arms thereto, said connecting means including block means fixedly mounted on the lower ends of the side portions of each frame for pivotl connection of the lower ends of said arms thereto, and collars slidably mounted on the side portions of each frame for pivotal connection of the upper ends of said arms thereto;

locking means associated with the rear frame to lock said cover in a closed, partially extended or fully extended position, said locking means including a plurality of vertically spaced recesses in the side portions of said rear frame, an aperture in said collars on said rear frame adapted to be aligned with each of said recesses in said side portions as said collars slide vertically on said side portions, and a locking pin for insertion into said aperture and an aligned recess; and canopy means disposed within and attached to said frames along the inner surface thereof, said canopy means comprising a canopy adapted to be stretched within said frames when said cover is extended and to pleat and fold below said frames hen said cover is collapsed, and canopy attaching means, said attaching means comprising a webbing on the surface of said canopy remote from said frames, a bearing member disposed on the surface of said webbing remote from said canopy and connecting means passing through said member, said webbing and said canopy and secured to said frames.

9. A retractable cover, as claimed in claim 6, wherein said locking means is associated with the rear frame of said cover.

10. A retractable cover, as claimed in claim 6, wherein said means for pivotal connection of the arms further includes block means fixedly mounted on the lower ends of the side portions of each frame for pivotal connection of the lower ends of said arms thereto and wherein said collars are adapted to slide upwardly on said side portions as said frames are moved toward each other.

11. A retractable cover, as claimed in claim 10, wherein said locking means is associated with the rear frame of said cover.

12. A retractable cover, as claimed in claim 6, wherein said canopy means includes means to attach said canopy into contact with the inner surface of said frames, said attaching means comprising a webbing on the surface of said canopy remote from said frames, a bearing member disposed on the surface of said webbing remote from said canopy and connecting means passing through said member, said webbing and said canopy and secured to said frames.

13. A retractable cover, as claimed in claim 6, wherein said follower means comprises roller means adapted to be received and to roll within said track means.

* * * * *